Patented Jan. 11, 1949

2,458,519

UNITED STATES PATENT OFFICE 2,458,519

ACYLATING THIOPHENE WITH SILICA-ALUMINA CATALYST

Alvin I. Kosak, Columbus, Ohio, and Howard D. Hartough, Pitman, N. J., assignors to Socony-Vacuum Oil Company, Incorporated, a corporation of New York No Drawing. Application September 28, 1945, Serial No. 619,251

17 Claims. (Cl. 260—329)

1

This invention relates to a process for the acylation of thiophenes and more particularly is directed to a method for acylating thiophene and its derivatives in the presence of a porous absorptive silica-alumina catalyst.

Acylation reactions are well known in the art and connote the union between acyl radicals and molecules of organic compounds under conditions of temperature, pressure and time ordinarily referred to in the art as acylating conditions. The compounds thus produced represent, structurally, the addition of the original acyl radical to the organic compound molecule.

As a general rule, the temprature, pressure and time of reaction employed in acylation operations depend upon whether the acylation is effected in the absence or presence of acylation catalysts. The two methods are generally referred to as thermal and catalytic acylation respectively. The majority of acylation processes fall under the latter category and it is a catalytic acylation process with which the present invention is concerned.

The acyl radicals may be furnished in acylation reactions by various materials commonly referred to as acylating agents. Thus, organic acid anhydrides, acyl halides and acyl nitriles have served as sources of the acyl radical. In particular acetic anhydride and acetyl chloride have found wide application in acylation operations.

The acylation of thiophene and thiophene derivatives has previously been carried out employing one of the above-mentioned acylating agents in the presence of various catalysts including aluminum chloride, stannic chloride, titanium tetrachloride, phosphorus pentoxide and 2-chloromercurithiophene. Other methods of making acylated thiophene include the dry distillation of calcium salts of thiophene carboxylic acids and the action of nitriles on thienylmagnesium iodide.

Of these processes, the catalytic methods employing Friedel-Crafts type catalyst such as aluminum chloride, stannic chloride, titanium tetrachloride and the like have been used most extensively. These catalysts although applicable with considerable success in the acylation of aromatic hydrocarbons are only moderately successful where thiophene is involved. This appears to be due to the relative instability of the thiophene ring, the Friedel-Crafts catalyst, for example aluminum chloride, attacking the sulfur and causing many undesirable secondary reactions with concomitantly low yields of acyl thiophenes. Furthermore, compounds such as aluminum chloride form addition complexes with the carbonyl group of the resulting ketone substantially decreasing

2 the yield of desired product and requiring a considerable excess of aluminum chloride over the theoretical amount required for the acylation process. Thus, when aluminum chloride is used as the condensing agent, the mol ratio of catalyst to acyl chloride or acyl nitrile is at least one and in the case of acid anhydrides at least two. Likewise, other Friedel-Crafts catalysts such as stannic chloride must be used in molecular quantities with respect to the acyl halide being employed in the acylation of thiophene. This is probably due to the fact that acyl halides form comparatively stable molecular complexes with aluminum chloride and stannic chloride thereby diminishing their catalytic effect.

Moreover, the use of aluminum chloride in the acylation of thiophene entails strict observance of detail in experimental observations. Thus, it is known that thiophene and aluminum chloride react vigorously in carbon disulfide suspension. It has been reported that a moderately good yield of phenyl-thienyl ketone is obtained by adding a solution of benzoyl chloride and thiophene in carbon disulfide to a suspension of aluminum chloride in the same solvent. If, however, a carbon disulfide solution of the acid chloride was added to a suspension of thiophene and aluminum chloride, much tar was formed and a low yield of ketone resulted. The acylation of thiophene has accordingly been an exceedingly difficult reaction to carry out, the usual acylation catalysts causing excessive resinification of the thiophene reactant. The resinification usually occurs before acylation can be effected, and if the expected reaction product is formed, it is generally only in relatively small amounts.

It has now been discovered that acylated thiophenes may be obtained in an efficient manner by reacting thiophene or thiophene derivatives with an acylating agent in the presence of a porous absorptive silica-alumina catalyst. It has been found that by using a silica-alumina catalyst, the above-mentioned difficulties encountered in the acylation of thiophene have largely been overcome. Thus, by employing a silica-alumina catalyst, the undue resinification and formation of addition complexes formerly encountered in the catalytic acylation of thiophene have been substantially eliminated, the products resulting being almost entirely acyl thiophenes having one or more side chains corresponding to that of the acylating agent. It has been found in accordance with this invention that porous silica-alumina composites effect the acylation of thiophene smoothly and specifically in contrast to the more conventional catalysts employed heretofore, giving a substantial yield of desired ketone without accompanying formation of complex addition products and resinification. The acylation of thiophenes using a silica-alumina catalyst moreover, can be carried out in a direct manner without a detailed observance of experimental conditions such as is a necessary precaution to be taken when aluminum chloride is employed as catalyst.

It is accordingly, an object of the present invention to provide an efficient process for synthesizing acylated thiophenes. Another object is to provide a process for catalytically acylating thiophene and its derivatives. A still further object is to afford a process for catalytically acylating thiophene in a relatively simple and direct manner which can be easily carried out using an inexpensive easily obtainable catalyst. A very important object is to provide a process capable of reacting thiophene or its derivatives with an acylating agent in the presence of an efficient cataylst without undue formation of addition complexes between the catalyst and thiophene or between the catalyst and acylating agent.

These and other objects which will be recognized by those skilled in the art are attained in accordance with the present invention wherein thiophene or its derivatives are acylated by reaction with organic carboxylic acid anhydrides or acyl halides in the presence of a porous absorptive silica-alumina catalyst.

Naturally occurring silica-alumina clays of the montmorillonite type which have been activated have been found to be effective catalysts for promoting the acylation of thiophenes. Other clays contemplated for use in the present process include fuller's earth and Attapulgus clay such as is commonly used for percolation of lubricating oils. In addition to the natural silica-alumina clays, synthetic silica-alumina catalysts such as those extensively employed in the cracking of petroleum hydrocarbons may be used. These catalysts are synthetic porous absorptive composites comprising silica and alumina which may be formed in various ways, as for example precipitating silica on alumina, or alumina on silica, or by combining a silica gel with alumina or by preparing a silica-alumina gel. The synthetic or naturally occurring silica-alumina catalysts are employed in the process of this invention usually in a finely divided form and in amounts varying between about 2% and about 25% based on the weight of the reactants.

The acylating agents to be used herein may be an organic carboxylic acid anhydride or an acyl halide. These may be derived by methods well known to the art from mono or dibasic organic acids which may be either unsaturated or saturated. Thus, representative acylating agents to be used in this invention include the anhydrides of saturated fatty acids, such as acetic anhydride, propionic anhydride, etc.; the acyl halides of saturated fatty acids such as acetyl chloride, stearyl chloride, etc.; the acyl halides of dibasic acids such as phthalyl chloride; the anhydrides of unsaturated acids such as crotonic anhydride and the acyl halides of unsaturated acids such as crotonyl chloride. These acylating agents are given merely by way of examples and are not to be construed as limiting since other acyl halides or anhydrides of carboxylic acids which will readily suggest themselves to those skilled in the art may likewise be used. It is to be noted that acyl nitriles and carboxylic acids which have been employed in some acylation reactions, fail to acylate thiophene under the conditions of the present process and hence are not to be included herein as acylating agents.

Thiophene or derivatives of thiophene having one or more substituent groups such as halogen, alkyl, aryl, or alkoxy groups attached to the thiophene ring may be acylated in accordance with this invention. The 2- and 5-positions in the thiophene ring being adjacent to the sulfur atom are generally much more reactive than the 3- and 4-positions and in acylating thiophene the entering acyl group will preferably attach itself to the carbon atom adjacent to the sulfur. When the 2-position of the thiophene ring is already occupied by a substituent group or atom, the entering acyl group will preferably attach itself to the 5-position. When the 3-position is occupied, the acyl substituent will enter for the most part at the 2-position. However, in some instances a small portion of the 3,5-product may be obtained. Thiophene derivatives having substituents of a highly negative character such as carbonyl, ester, nitro and cyano groups and no activating substituent such as a hydroxy or alkoxy group do not acylate readily. These groups, commonly referred to as meta-directing, possess a highly electronegative character which tends to inhibit the acylation reaction.

The acylation of thiophene or its derivatives may be carried out employing equimolar quantities of thiophene and acylating agent. However, the presence of an excess of one of the reactants has been found to give an increased yield of the desired product. Thus, experiments identical in all respects except reactant ratio showed that an acetic anhydride-thiophene ratio of 2:1 resulted in appreciably higher conversions to ketone that is about 1.5 to 1.7 times the amount obtained when equimolar quantities were used. Similarly, an excess of thiophene also raises the yield of ketone. As is to be expected, other factors remaining constant, the rate of reaction will generally be more rapid when an excess of one of the starting materials is present.

The reaction rate, however, is largely a function of the temperature, increasing with increasing temperatures, the upper limit of temperature being dependent on the boiling point of the reactants at the specific pressure of the reaction. In general, temperatures varying between about 80° C. and about 150° C. and pressures varying between atmospheric and about 6 atmospheres have been found satisfactory for effecting the acylation reaction. The effect of increased pressure, theoretically, is toward increased reaction, but from a practical standpoint, this is not a very great effect with reactions such as those involved herein, which go readily at normal pressures. The temperature to be employed will depend on the time of reaction and the nature of the acylating agent used. Ordinarily, a pressure sufficient to maintain the reactants in the liquid phase is employed and this is more or less dependent upon the particular temperature involved. As a general rule, the higher the temperature, the higher the pressure and the lower the reaction time required. It is of course to be understood that these reaction variables are more or less interdependent.

Under the conditions encountered in the process of this invention, however, the reaction period will generally vary from about 1 to about 10 hours. Considerably shortened reaction times are to be avoided since it has been found that a reaction period of about ⅓ hour gave a yield of product only about 55–65% of the amount obtained under similar conditions of temperature and pressure but with a reaction period of about 4 hours duration.

The silica-alumina catalyst may be employed in amounts as little as 2% by weight of the reactants. However, amounts varying between about 7% and about 10% by weight are to be preferred. The catalysts as indicated may be a natural clay of the montmorillonite type or a synthetic silica-alumina composite. Generally clays which have been activated by acid treatment and heating at elevated temperatures and which have a weight ratio of silica to alumina of not less than three to one and preferably from four to one or higher will be used. The amount of silica will usually vary from about 70 to 80 per cent and the amount of alumina from 10 to 20 per cent by weight of the clay. The remaining components comprising particularly ferric oxide, calcium oxide, and magnesium oxide should comprise less than 10 per cent of the clay.

Synthetic silica-alumina catalysts may be prepared in numerous ways well known to the art by the formation of gels or gelatinous precipitates comprising essentially silica and alumina. A representative method of preparing such synthetic catalysts is described in U. S. Patent 2,232,727 to Peterkin et al. A particularly effective catalyst was found to be spheroidal pellets of silica-alumina gel, prepared by mixing an acidic stream of aluminum sulphate and a stream of sodium silicate and allowing the resulting sol to be ejected from a nozzle into an oil column where the gel set in the form of bead-like pellets. The resulting gel spheres after washing, drying and tempering were utilized in the acylation of thiophene and proved to be excellent catalysts for the promotion of the reaction. A further description of the method of preparing the above described silica-alumina spheroidal pellet is disclosed in U. S. Patent 2,384,946, issued September 18, 1945, to Milton M. Marisic. The catalyst whether a synthetic composite or a natural clay should preferably have a fairly small particle size. After use in the acylation process, the spent silica-alumina catalyst may be reactivated by heating at elevated temperatures for a period sufficient to restore its original activity. Thus, a spent silica-alumina acylation catalyst may be reactivated by heating at about 1000° F. for about 2 hours. The original catalyst may hence be reused a considerable number of times before it degenerates completely and must be discarded.

Acylated thiophenes produced in accordance with this invention are useful as solvents, dye intermediates, addition agents for petroleum fractions, plasticizers, odorants, perfume diluents, resin intermediates and intermediates for chemical synthesis. Long chain alkyl thienyl ketones may also find uses as synthetic lubricants, waxes, extreme pressure additives for mineral oils and anti-foaming agents.

The following detailed examples are for the purpose of illustrating modes of effecting the acylation of thiophene in accordance with the process of this invention. It is to be clearly understood that the invention is not to be considered as limited to the specific acylating agents disclosed hereinafter or to the manipulations and conditions set forth in the examples.

Example 1

A mixture of 252 grams (3 mols) of thiophene, 408 grams (4 mols) of acetic anhydride and 65 grams of activated silica-alumina clay was refluxed at a temperature rising from 98° C. to 104° C. over a period of six hours. The reaction product was then filtered, the clay residue washed with acetone to dissolve any adhering product and the solution distilled yielding 214 grams of 2-acetyl-thiophene having a boiling point of 77° C. at 4 mm. pressure and an index of refraction at 20° C. of 1.5666. This represents a conversion of 56.5% to ketone or 86% yield based on the amount of thiophene consumed in the reaction. The semicarbazone of the product melted at 194–194.5° C. and contained 22.7% nitrogen as compared with a calculated value of 23.0%. The 2,4-dinitrophenylhydrazone melted at 245° C. and analyzed 17.2% nitrogen, the calculated being 18.3%.

Example 2

A mixture of 168 grams (2 mols) of thiophene, 224 grams (2 mols) of 90–95% acetic anhydride, and 50 grams of activated silica alumina clay was heated at a temperature rising from 200° C. to 230° C. over a period of six hours in a rocking autoclave. The pressure at the end of the reaction was 230 pounds per square inch. 53 grams (21% of the theoretical yield) of 2-acetylthiophene was obtained by distillation of the resulting product.

Example 3

A mixture of 84 grams (1 mol) of thiophene, 78.5 grams (1 mol) of acetyl chloride and 25 grams of activated silica alumina clay was refluxed for 9 hours at 85° C. yielding 28.5 grams (23% of theory) of 2-acetylthiophene by distillation of the resulting product.

Example 4

A mixture of 84 grams (1 mol) of thiophene, 102 grams (1 mol) of acetic anhydride and 15 grams of activated silica alumina clay was refluxed at a temperature rising from 98° C. to 104° C. over a period of one hour yielding 47.5 grams (38% of theory) of 2-acetylthiophene by distillation of the resulting product.

Example 5

A mixture of 40.5 grams (0.26 mol) of 2-secondary normal amyl thiophene, 30.6 grams (0.3 mol) of acetic anhydride and 15 grams of activated silica-alumina clay was refluxed at a temperature rising from 141° C. to 148° C. over a period of six hours. The catalyst was removed by filtration and distillation of the filtrate yielded 35.6 grams (70% of theory) of 2-acetyl-5-secondary normal amylthiophene boiling at 120–126° C. at 4 mm. pressure and having an index of refraction at 20° C. of 1.5321. The semicarbazone of the product melted at 167.5° C. and analyzed 16.3% nitrogen; the calculated value being 16.6%.

Example 6

A mixture of 118.5 grams (1 mol) of 2-chlorothiophene, 102 grams (1 mol) of acetic anhydride, and 25 grams of activated silica-alumina clay was refluxed at 127° C. for 4.75 hours and the reaction product filtered. The filtrate was topped to a pot temperature of 170° C. and the residue poured into ice water. The ketone separated as a dark brown oil which solidified rapidly upon stirring. It was then washed with sodium carbonate solution followed by water and collected on a Buchner funnel. 55 grams (34% of theory) of 2-acetyl-5-chlorothiophene was obtained upon recrystallization from alcohol. 53 grams (44.7%) of chlorothiophene was recovered. The semicarbazone of the product melted at 241° C. and analyzed 18.8% nitrogen, the calculated value being 19.3%.

Example 7

A mixture of 264 grams (0.87 mol) of stearyl chloride, 84 grams (1 mol) of thiophene and 25 grams of activated silica alumina clay were refluxed together at 105° C. for 4.5 hours and filtered while hot. The filtrate was warmed with water to decompose unreacted stearyl chloride and the product was washed with 10% sodium carbonate solution. Extraction with benzene and evaporation of the solvent yielded 2-stearyl-thiophene, a wax-like solid whose melting point as determined on a Maquenne block was 44° C. The melting point of the 2,4-dinitrophenylhydrazone was 78° C. as determined on the Maquenne block and analyzed 9.9% nitrogen, the calculated amount being 10.6%.

Example 8

A mixture of 84 grams (1 mol) of thiophene, 51 grams (0.48 mol) of 95% acetic anhydride and 15 grams of activated silica-alumina clay was refluxed at a temperature rising from 95° C. to 108° C. over a period of four hours, yielding 37.5 grams (63.5% of theory) of 2-acetylthiophene upon distillation of the resulting product.

Example 9

A mixture of 84 grams (1 mol) of thiophene, 130 grams (1 mol) of propionic anhydride and 15 grams of activated silica-alumina clay were refluxed together with stirring at a temperature rising from 94° C. to 132° C. over a period of four hours, yielding 74.5 grams (53.2% of theory) of 2-propionylthiophene which boiled at 226–227.5° C.

Example 10

A mixture of 52 grams (0.5 mol) of crotonyl chloride, 42 grams (0.5 mol) thiophene and 10 grams of activated silica-alumina clay was refluxed at a temperature rising from 77° C. to 122° C. over a period of six hours, yielding 17.5 grams (23% of theory) of 2-crotonyl thiophene having a boiling point of 109–116° C. at 5 mm. pressure.

Example 11

A mixture of 84 grams (1 mol) of thiophene, 102 grams (1 mol) of acetic anhydride and 50 grams of Attapulgus clay (industrial grade used for percolation of lubricating oils) were refluxed together with stirring for 6 hours, yielding 24 grams (20% of theory) of 2-acetylthiophene.

Example 12

A mixture of 126 grams (1.5 mol) of thiophene, 77 grams (0.72 mol) of acetic anhydride, and 20 grams of 100 mesh and finer synthetic silica-alumina petroleum cracking catalyst were refluxed together at a temperature rising from 88° C. to 97° C. over a period of four hours. After working up the product as in Example 1, 56 grams (61.8% of theory) of 2-acetylthiophene was obtained.

Example 13

A mixture of 126 grams (1.5 mols; 0.5 mol excess) of thiophene, 102 grams (0.5 mol) of phthalyl chloride and 10 grams of activated silica-alumina clay was stirred together at 70° C. for 1.5 hours and then heated to reflux for 2.5 hours longer. The evolution of CHl at that time had practically ceased. The mixture was then cooled, poured into ice and then neutralized with sodium hydroxide. The thiophene layer was water washed once and the thiophene removed by distillation to produce 24 grams of a black tarry material that crystallized slowly upon standing. A brown crystalline product was extracted from this mixture with absolute alcohol leaving behind 4 grams of black tarry alcohol insoluble material.

The alcohol soluble material was treated with decolorizing charcoal, filtered, and evaporated to dryness leaving 18 grams (13% of theory) of 3,3-bis-(2-thienyl)phthalide which was a yellow crystalline material. Analysis of this semi-crude product gave a value of 20.9% sulfur, the calculated value being 21.5%. Subsequent purification by recrystallization from ethyl acetate containing a little petroleum ether gave a light yellow crystalline material having a melting point of 97–98° C.

Example 14

A mixture of 107 grams (1 mol) of acetic anhydride, 84 grams (1 mol) of thiophene and 25 grams of 4–6 mesh spheroidal silica-alumina gel pellets were refluxed for a period of 6 hours at a temperature rising from 104° C. to 117° C. The reaction mixture was then cooled. Acetic anhydride present was removed by distillation and 81 grams of 2-acetylthiophene were obtained by distilling which represented a yield 64% of the theoretical yield.

Example 15

A mixture of 107 grams (1 mol) of acetic anhydride, 84 grams (1 mol) of thiophene and 25 grams of spheroidal silica-alumina gel pellets which had been crushed to a particle size of 60 mesh and smaller were refluxed for 6 hours at a temperature rising from 95° C. to 138° C. The reaction mixture was then cooled and distilled yielding 100 grams (79% of theory) of 2-acetylthiophene.

We claim:

1. A process for nuclear acylation of a thiophene, comprising reacting a thiophene with an acylating agent selected from the group consisting of acyl halides and anhydrides of carboxylic acids in the presence of a porous absorptive silica-alumina catalyst.

2. A process for nuclear acylation of a thiophene, comprising reacting a thiophene with an acylating agent selected from the group consisting of acyl halides and anhydrides of carboxylic acids in the presence of a porous absorptive activated silica-alumina clay.

3. A process for nuclear acylation of a thiophene, comprising reacting a thiophene with an acylating agent selected from the group consisting of acyl halides and anhydrides of carboxylic acids in the presence of a porous absorptive synthetic silica-alumina composite.

4. A process for nuclear acylation of a thiophene, comprising reacting a thiophene with an acylating agent selected from the group consisting of acyl halides and anhydrides of carboxylic acids in the presence of a porous absorptive silica-alumina catalyst, the silica-alumina ratio of which varies between about 3:1 and about 8:1.

5. A process for nuclear acylation of a thiophene, comprising reacting a thiophene with an acylating agent selected from the group consisting of acyl halides and anhydrides of carboxylic acids in the presence of a porous absorptive activated silica-alumina clay, the silica-alumina ratio of which varies between about 3:1 and about 8:1.

6. A process for nuclear acylation of a thiophene, comprising reacting a thiophene with an acylating agent selected from the group consisting of acyl halides and anhydrides of carboxylic acids in the presence of a porous absorptive synthetic silica-alumina composite, the silica-alumina ratio of which varies between about 3:1 and about 8:1.

7. A process for nuclear acylation of a thiophene, comprising reacting a thiophene with an acylating agent selected from the group consisting of acyl halides and anhydrides of carboxylic acids in the presence of a porous absorptive activated silica-alumina clay, having an approximate composition of from 70 to 80 percent silica, from 10 to 20 percent alumina, the remaining constituents comprising less than 10 percent by weight of the clay.

8. A process for nuclear acylation of a thiophene, comprising reacting a thiophene with an acylating agent selected from the group consisting of acyl halides and anhydrides of carboxylic acids in the presence of from about 2 to about 25% by weight of a porous absorptive silica-alumina catalyst at a temperature varying between about 80° C. and about 150° C. for a period of from about 1 to about 10 hours.

9. A process for nuclear acylation of a thiophene, comprising reacting a thiophene with an acylating agent selected from the group consisting of acyl halides and anhydrides of carboxylic acids in the presence of from about 2 to about 25% by weight of a porous absorptive activated silica-alumina clay at a temperature varying between about 80° C. and about 150° C. for a period of from about 1 to about 10 hours.

10. A process for nuclear acylation of a thiophene, comprising reacting a thiophene with an acylating agent selected from the group consisting of acyl halides and anhydrides of carboxylic acids in the presence of from about 2 to about 25% by weight of a porous absorptive synthetic silica-alumina composite at a temperature varying between about 80° C. and about 150° C. for a period of from about 1 to about 10 hours.

11. A process for nuclear acylation of an alkyl thiophene, comprising reacting the same with an acylating agent selected from the group consisting of acyl halides and anhydrides of carboxylic acids in the presence of a porous absorptive silica-alumina catalyst.

12. A process for nuclear acylation of a halogen substituted thiophene, comprising reacting the same with an acylating agent selected from the group consisting of acyl halides and anhydrides of carboxylic acids in the presence of a porous absorptive silica-alumina catalyst.

13. A process for nuclear acylation of thiophene, comprising reacting thiophene with an acylating agent selected from the group consisting of acyl halides and anhydrides of carboxylic acids in the presence of a porous absorptive silica-alumina catalyst.

14. A process for nuclear acylation of a thiophene, comprising reacting a thiophene with an acylating agent selected from the group consisting of acyl halides and anhydrides of carboxylic acids in the presence of from about 2 to about 25% by weight of a porous absorptive silica-alumina catalyst.

15. A process for nuclear acylation of a thiophene, comprising reacting a thiophene with an acylating agent selected from the group consisting of acyl halides and anhydrides of carboxylic acids in the presence of from about 7 to about 10% by weight of a porous absorptive silica-alumina catalyst.

16. A process for nuclear acylation of thiophene, comprising reacting thiophene with an acyl halide in the presence of from about 2 to about 25% by weight of a porous absorptive silica-alumina catalyst.

17. A process for nuclear acylation of thiophene, comprising reacting thiophene with a carboxylic acid anhydride in the presence of from about 2 to about 25% by weight of a porous absorptive silica-alumina catalyst.

ALVIN I. KOSAK.
HOWARD D. HARTOUGH.

REFERENCES CITED

The following references are of record in the file of this patent:

UNITED STATES PATENTS

| Number | Name | Date |
|---|---|---|
| 2,349,904 | Hachmuth | May 30, 1944 |

OTHER REFERENCES

Gilman: "Organic Chemistry," Edition 2, vol. 1, pages 181, 183. John Wiley, N. Y. 1943.
Chemical Abstracts, 25: 2719 (2) (1931).

Certificate of Correction

Patent No. 2,458,519. January 11, 1949.

ALVIN I. KOSAK ET AL.

It is hereby certified that error appears in the printed specification of the above numbered patent requiring correction as follows:

Column 7, line 74, for "CHl" read *HCl*;

and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*